A. A. BULLOCK.
FERTILIZER DISTRIBUTER.
APPLICATION FILED AUG. 16, 1909.
944,173.
Patented Dec. 21, 1909.
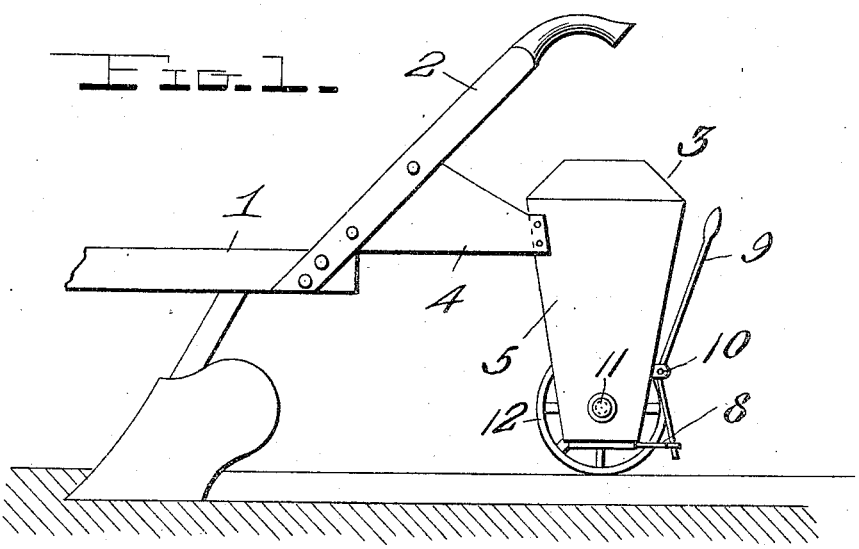
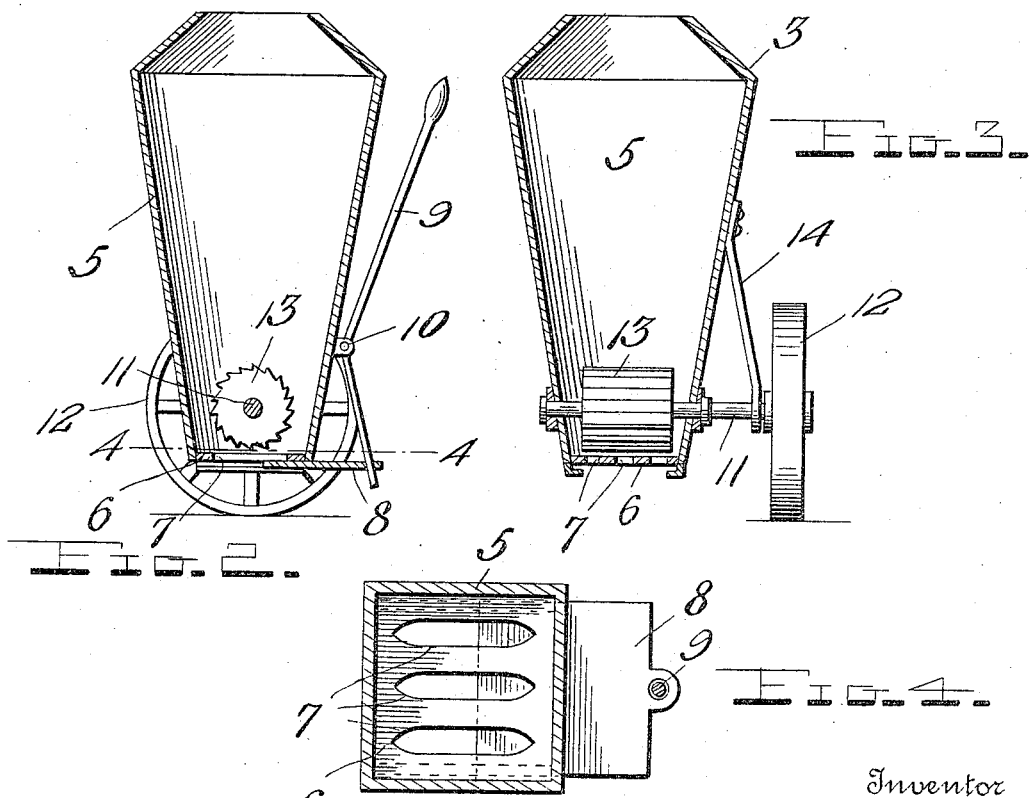
Witnesses
Chas. L. Griesbauer.
C. H. Griesbauer.
Inventor
A. A. Bullock
by H. R. Willison & Co.
Attorneys

UNITED STATES PATENT OFFICE.

ALEXANDER A. BULLOCK, OF DABNEY, NORTH CAROLINA, ASSIGNOR OF ONE-HALF TO OWEN DAVIS, OF HENDERSON, NORTH CAROLINA.

FERTILIZER-DISTRIBUTER.

944,173.  Specification of Letters Patent.  Patented Dec. 21, 1909.

Application filed August 16, 1909. Serial No. 513,042.

*To all whom it may concern:*

Be it known that I, ALEXANDER A. BULLOCK, a citizen of the United States, residing at Dabney, in the county of Vance and State of North Carolina, have invented certain new and useful Improvements in Fertilizer-Distributers; and I do declare the following to be a full, clear, and exact description of the invention, such as will enable others skilled in the art to which it appertains to make and use the same.

This invention relates to improvements in fertilizer distributers.

One object of the invention is to provide a fertilizer distributer adapted to be attached to a plow, whereby the fertilizer may be distributed in the furrows, as they are being formed by the plow.

Another object is to provide a device of this character having means whereby the fertilizer will be positively fed from the hopper and means to regulate the feed of the fertilizer.

With the foregoing and other objects in view, the invention consists of certain novel features of construction, combination and arrangement of parts, as will be more fully described and particularly pointed out in the appended claim.

In the accompanying drawings, Figure 1 is a side view of a plow showing the application of the invention thereto; Fig. 2 is a vertical longitudinal section of the fertilizer distributer; Fig. 3 is a similar view, taken at right angles to Fig. 2; Fig. 4 is a cross sectional view through the lower end of the hopper.

Referring more particularly to the drawings, 1 denotes a plow which may be of any construction and 2 denotes the plow handles.

My improved fertilizer distributer 3 is attached to the handles 2 of the plow by brace plates or other suitable fastening devices 4 whereby the distributer is carried in a position immediately in rear of the plow.

The fertilizer distributer comprises a hopper 5 which preferably tapers downwardly on all four sides from its upper to its lower end and in said reduced lower end is arranged a feed plate or bottom 6 having formed therein a plurality of discharge passages 7 of which there are preferably three, said passages being arranged in the form of slots extending longitudinally of the plate, as shown.

In the lower portion of the hopper and slidably mounted on the feed plate 6, is a valve or gage plate 8 which is connected to the lower end of a shifting lever 9 which is pivotally mounted on the rear side of the hopper, as shown at 10. By means of the lever 9, the gage plate 6 is shifted back and forth over the discharge passages 7 in the feed plate, thus opening and closing the same to a greater or less extent and thereby regulating the feed of the fertilizer from the hopper.

Revolubly mounted in suitable bearings in the opposite sides of the hopper is a transversely disposed shaft or axle 11 which passes through the lower portion of the hopper and has revolubly mounted on its outer end a supporting and operating wheel 12. Fixedly mounted on the shaft 11, within the hopper 5, is a toothed feed wheel 13 which is adapted to force the fertilizer from the hopper through the discharge passages in the feed plate, thus preventing the passages from becoming clogged up and insuring a positive feed of the fertilizer when the plow is in motion. The shaft or axle 11 is preferably supported at its outer end by an inclined brace rod 14 connected thereto, as shown.

It will be noted that the supporting and operating wheel 12 is arranged on the landside of the plow and therefore travels on smooth solid ground and not in the furrows or plowed portions of the field.

By means of a fertilizer distributer constructed and arranged as herein shown and described, the fertilizer is dropped or fed directly into the furrows simultaneously with the forming of the same by the plow.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

In a fertilizer distributer, a hopper, means for attaching the hopper to the handles of the plow, a slotted feed plate arranged in the lower end of the hopper with the slots extending longitudinally thereof, a gage plate mounted to slide longitudinally on said feed plate, an elbow-shaped operating lever pivoted at the bend thereof to said hopper and connected at its lower end to said gage plate, whereby the latter may be reciprocated to regulate the feed of the fertilizer from the hopper, a shaft revolubly mounted in the hopper and projecting laterally beyond one side thereof in the direction of the land side of the plow, a supporting and operating wheel fixedly mounted on the projecting end of said shaft and a toothed wheel fixed on said shaft within said hopper and adapted to force the fertilizer through the discharge slots in said feed plate.

In testimony whereof I have hereunto set my hand in presence of two subscribing witnesses.

ALEXANDER A. BULLOCK.

Witnesses:
 H. BEACOM,
 E. W. ELLIS.